UNITED STATES PATENT OFFICE.

JONAS EMILE BLOMÉN, OF WASHINGTON, DISTRICT OF COLUMBIA, ASSIGNOR TO THE JOVEITE MANUFACTURING COMPANY, OF VIRGINIA.

PROCESS OF MAKING EXPLOSIVES.

SPECIFICATION forming part of Letters Patent No. 599,589, dated February 22, 1898.

Application filed December 29, 1894. Renewed January 22, 1898. Serial No. 667,659. (No specimens.)

*To all whom it may concern:*

Be it known that I, JONAS EMILE BLOMÉN, of Washington, in the District of Columbia, have invented a certain new and useful Improvement in the Manufacture of Explosives, of which the following is a specification.

The object I have in view is to produce economically and effectively a strong quick-acting explosive. This explosive under my invention consists, essentially, of a mixture of cellulose nitrates—such, for example, as tri and tetra nitrocelluloses—with nitro or nitrohydroxyl hydrocarbon derivatives, or both, and an oxidizing agent. The cellulose nitrates make the composition quick acting and measurably possess strength. The specified hydrocarbon derivatives increase materially the strength of the compound, and the oxidizing agent serves to oxidize the excess of carbon in the nitrohydrocarbons and thus to effect complete combustion.

The nitro or nitrohydroxyl hydrocarbon derivatives above specified, besides being explosives in themselves and serving to increase considerably the explosive character of the compound of which they form a part, are solvents of cellulose nitrate; but their melting-point is so high that at the temperature at which they become fluid it is extremely dangerous to mix them with cellulose nitrates. I have ascertained that by treating said nitrohydrocarbons with a volatile organic solvent—such, for example, as amyl acetate—they can be dissolved at a much lower temperature—not exceeding, in fact, 58° centigrade. In this way I obtain what may be termed a "composite" solvent, which is entirely effective as a solvent of cellulose nitrates and with which the latter can be treated so as to insure an intimate mingling of the constituents without any danger. The result of this treatment will be a true solution of the cellulose nitrates in the aforesaid derivatives, the product of which solution is perfectly homogeneous and uniform throughout. In other words, I dissolve at a low heat one or more of the nitro derivatives or the nitrohydroxyl derivatives of the hydrocarbons, or both, in a volatile organic solvent, by which I put the said derivatives in condition to act as a solvent for cellulose nitrates. Then cellulose nitrates are added, then an oxidizing agent, and then the viscous or dough-like product thus obtained is dried and granulated, the volatile organic solvent being driven off to a large extent, if not entirely, by and during the drying process.

To enable others to understand and use my invention, I shall now proceed to describe more in detail the preferred way of carrying it into effect.

To about five (5) parts, by weight, of the volatile solvent, preferably amyl acetate, I add about ten (10) parts of the hydrocarbon derivatives, preferably nitronaphthalene, and heat the mixture up to a temperature of about 58° centigrade. The temperature in some cases may be less. In practice it does not exceed the point named. The result is the production in the form of a solution of what I have hereinbefore termed a "composite" solvent for the cellulose nitrates. To this heated composite solvent solution I now add about thirty-three per cent., by weight, of cellulose nitrates in a finely-divided condition, the relative proportion of this ingredient to the solution varying with the degree of nitration of the hydrocarbon derivatives and the cellulose nitrates. For example, suppose the hydrocarbon derivative is a mixture of nitronaphthalenes, principally dinitronaphthalene, and the nitrocellulose is of the highest nitration—that is, hexanitrocellulose or guncotton—then the proportion would be, say, about six of the former to about thirty of the latter; or, if the nitrocellulose be trinitrocellulose, the proportions would be about six of the former to fifty of the latter, because the higher the nitration of the cellulose the less soluble it is in the composite solvent. On the other hand, if a mixture consisting of principally tetranitronaphthalene be used under the same circumstances instead of the dinitronaphthalene, then, as the tetranitronaphthalene is less effective as a solvent, the proportion would be about six to twenty in the first case and about six to thirty-five in the second case. Then I add oxidizing agents—such as nitrates, chlorates, or perchlorates. Taking, for example, barium nitrate as the oxidizing agent, I add about fifty-two per cent., by weight, of it to the mass. The resulting mixture, which is now of the consistency of a tough dough, is then rolled into a thin sheet, granulated, and dried, when the powder will be fit for use. In the process of drying the volatile organic solvent is more or less driven off and may be recovered in the usual way. This volatile organic solvent plays no part as an explosive in the resulting compound. It is used simply to bring the nitrohydrocarbons to a solution at a low heat and to maintain them in this condition, so that the nitrohydrocarbons in turn may at this low heat act as a solvent for the cellulose nitrates.

The proportions of the ingredients in such a powder as described may be largely varied, depending upon the degree of nitration of the nitrohydrocarbons and the cellulose nitrates, inasmuch as the amount of the volatile organic solvent required to produce the composite solvent and the amount of oxidizing agent necessary for complete combustion must vary with these changes in the constitution of the combustibles.

I state, in conclusion, that I am aware that the ethers of the marsh-gas series and other solvents have been used for dissolving cellulose nitrates, picric acid, and the like, and this I do not claim; but I am not aware that it ever before has been proposed to use a volatile organic solvent for lowering the melting-point of the nitro derivatives and nitrohydroxyl derivatives of the hydrocarbons to such an extent that the composite solution thus produced may safely be used as a solvent for cellulose nitrates, and this I believe to be new with me.

Having described my invention and the manner in which the same is or may be carried into effect, what I claim herein as new, and desire to secure by Letters Patent, is—

1. The herein-described improvement in the manufacture of explosives, consisting in treating nitro, and nitrohydroxyl, hydrocarbon derivatives with a volatile organic solvent, adding to the composite solvent thus obtained, cellulose nitrates and an oxidizing agent, and finally drying and granulating the resulting compound, substantially as described.

2. In the manufacture of explosive compounds, the method herein described of dissolving cellulose nitrates, which consists first in treating nitro, and nitrohydroxyl, hydrocarbon derivatives with a volatile organic solvent, and then treating the cellulose nitrates with the composite solvent solution thus obtained, substantially as hereinbefore set forth.

In testimony whereof I have hereunto set my hand this 29th day of December, 1894.

JONAS EMILE BLOMÉN.

Witnesses:
F. B. KEEFER,
NATHAN H. ROBBINS.